United States Patent [19]

Zelinka et al.

[11] 4,114,023
[45] Sep. 12, 1978

[54] HEATER CONTROL FOR ROTARY MEMBERS

[75] Inventors: Richard J. Zelinka, Lino Lakes; George K. Sutherland, White Bear, both of Minn.

[73] Assignee: Sys-Tec, Inc., New Brighton, Minn.

[21] Appl. No.: 734,755

[22] Filed: Oct. 22, 1976

[51] Int. Cl.² ............................................. H05B 1/02
[52] U.S. Cl. ................................. 219/471; 219/469; 219/494; 219/507
[58] Field of Search ............... 219/469, 470, 471, 494, 219/507, 10.75, 504; 73/351, 362

[56] References Cited

U.S. PATENT DOCUMENTS

| 2,526,906 | 10/1950 | Schaab et al. | 219/469 |
|---|---|---|---|
| 3,286,081 | 11/1966 | Scowcraft | 219/470 |
| 3,290,485 | 12/1966 | Pettit | 219/470 |
| 3,471,683 | 10/1969 | Bogue | 219/469 |
| 3,500,019 | 3/1970 | Childress | 219/471 |
| 3,637,984 | 1/1972 | Irvine | 219/471 |
| 3,758,738 | 9/1973 | Otani et al. | 219/471 |

Primary Examiner—J. V. Truhe
Assistant Examiner—Mark Paschall
Attorney, Agent, or Firm—Orrin M. Haugen; Thomas J. Nikolai

[57] ABSTRACT

A heater roll in which a resistor-type heater mounted in the roll is controlled by use of a temperature sensing element also located in the roll. Electrical power, particularly AC power, is provided through slip rings and the set point for the temperature control is determined by a signal from a current source applied through the slip rings. The set point transmitter is designed to provide a constant current signal to the temperature regulator, irrespective of resistance variations which may be introduced by changes in the slip ring characteristics. As such, the temperature regulator maintains a predetermined temperature in the rotating roll, irrespective of slip-ring resistance variations.

6 Claims, 4 Drawing Figures

HEATER CONTROL FOR ROTARY MEMBERS

BACKGROUND OF THE INVENTION

This invention relates generally to an arrangement for electrically controlling a physical quantity or parameter contained in a rotatable drum from a stationary location external thereto and more specifically to the improved design of a set point transmitter and associated regulator which maintains a desired parameter value in the drum in spite of variations in the resistance of the slip rings used to apply the electrical current and set point control signal to the regulating circuitry contained in the roll. While the invention will be described in connection with its application to a drum type heater, it is to be understood that it may be utilized in other applications.

In prior art drum-type heater arrangements, it is the common practice to mount both the heater regulating circuitry and the set point controller on a common shaft so that the two rotate in unison and power is fed to the combination through slip rings. The simultaneous rotation of the controller and the heat regulator is dictated by the fact that early attempts to transmit the set point information through slip rings to the rotating temperature regulating circuitry has resulted in unworkable devices due to the fact that the set point adjustment has been subject to variations with changes in the resistance of the slip rings and brushes used in the system. Typical of these prior art attempts are the inventions described in the Pettit U.S. Pat. No. 3,290,485, the Scowcroft U.S. Pat. No. 3,286,081, the Hosack U.S. Pat. No. 2,700,094, and the Nordquist U.S. Pat. No. 2,357,845. Each of these patents shows heated rollers having temperature sensors and heating elements mounted in the rollers and having temperature controllers rotating with the roller. In these prior art arrangements, in order to vary the roll temperature, it is necessary to bring the roll to a stop, make the desired adjustment in the heater control set-point mechanism, and then re-start the unit. It is, of course, desirable to be able to vary the temperature setting of the heating elements used in the roll while the roll continues in motion.

In accordance with the teachings of the present invention, a roll heater arrangement is provided in which the final control element rotates with the drum, but the stable reference used for external adjustability is remotely connected to the drum controller through means of a slip ring or rings. The prior art approaches have always resulted in instabilities of temperature control because of variations in the contact resistance of the slip rings and brushes due to wear, contamination, etc. By using the present invention, rather inexpensive slip rings may be employed to convey the set-point control signal to the rotating heater control element. This is accomplished by providing a unique transmitter that provides a constant current signal which is a function of a desired set point to the heater controller, the control signal being relatively unaffected by variations in the impedance introduced by the slip rings.

SUMMARY OF THE INVENTION

It is accordingly the principal object of the present invention to provide an improved feedback control system contained in a rotatable member with means for establishing the set-point value from a point external to the rotatable member.

Another more specific object of the invention is to provide a roll heater in which the set-point of the temperature regulator used therein may be controlled from a remote source without having to stop the rotation of the drum.

Still another object of this invention is to provide a novel roll heater in which a constant current signal which is a function of a desired set-point is transmitted to the temperature controller by means of slip-rings.

Still a further object of this invention is to provide a roll-type heater control circuit in which variations in impedance of the slip-rings used to convey the set-point control value to the temperature regulator does not result in deleterious operation.

A further related object of this invention is to provide a heater controller in which the final control element rotates with the drum, but where the stable reference used for external adjustability is remotely connected to the drum controller by means of a slip-ring and where variations in the slip-ring impedance does not significantly affect the set-point signal established by an operator at a remote location.

Other and further objects of the present invention will become apparent to those skilled in the art upon a reading of the following specification, appended claims, and accompanying drawings.

DESCRIPTION OF THE PREFERRED EMBODIMENT

Figure 1:
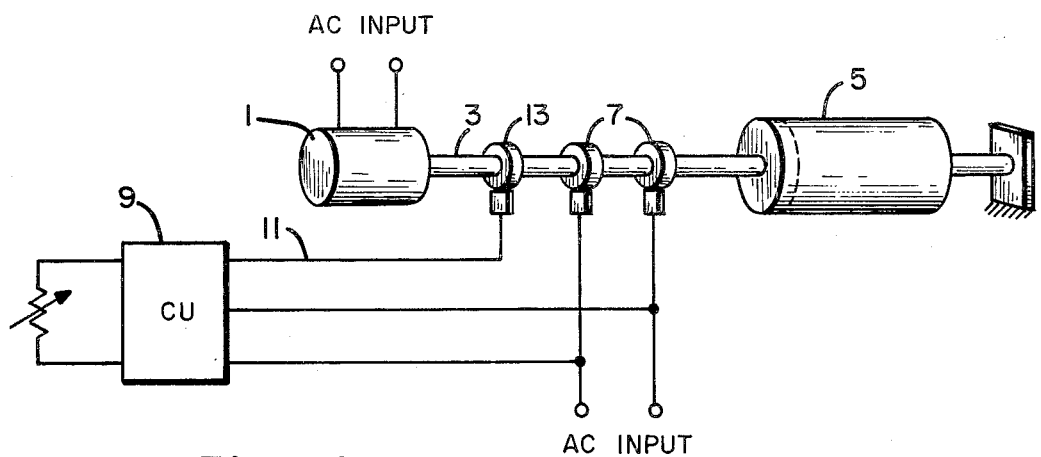
FIG. 1 is a schematic mechanical/electrical drawing of the preferred embodiment.

Referring first to FIG. 1, there is shown a mechanical/electrical drawing depicting the general construction and organization of the present invention. As is illustrated in FIG. 1, a motor 1 drives a shaft 3 to which is affixed, for rotation therewith, a drum 5. Contained within the drum 5 are a plurality of resistance heating elements, the current through which is controlled by a temperature regulator also contained either within the rotating drum 5 or alternatively attached to shaft 3 external to drum 5. Electrical power for the temperature regulating circuitry within the drum 5 is applied via the slip-rings and brushes identified by numeral 7. The same electrical power is applied to a control unit 9 which may be considered to be the remote set-point transmitter. It is to be noted that the transmitter 9 is not mounted on the shaft 3, but instead provides a control signal on line 11 which is coupled through the brush and slip-ring 13 to provide a signal to the temperature regulating circuitry disposed either within the drum 5 or attached externally to the shaft 3.

As has been explained in the introductory portion of this specification, prior art attempts to regulate the temperature in the drum 5 from an external source have been unsuccessful due primarily to the variations which naturally result in the resistance of the slip-ring 13 used to convey the set-point value to the regulator. However, in accordance with the teachings of the present invention, there is provided a novel control unit 9 and temperature regulator which is responsive to the signal produced by the control unit 9 which is not deleteriously affected by variations in slip-ring impedance. The details of the circuitry for implementing the set-point control unit 9 and the heater control device will now be described.

Figure 2:
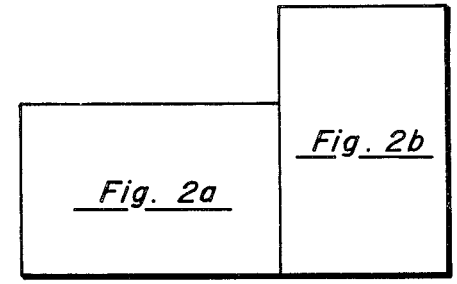
FIG. 2 shows the way in which the views of FIGS. 2a and 2b are oriented in representing a composite drawing of the preferred embodiment.
Figure 2B:
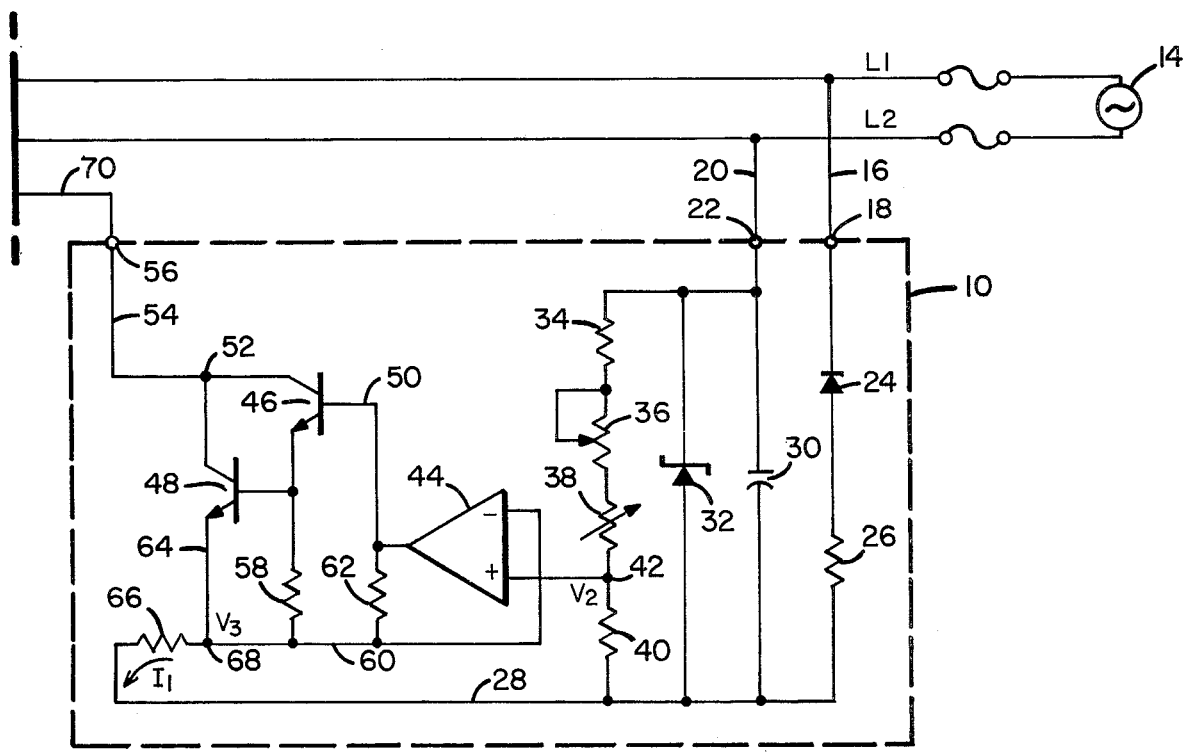
FIGS. 2a and 2b together comprise an electrical schematic showing the design of the set-point transmitter and feedback control unit comprising the preferred embodiment.
Figure 2A:
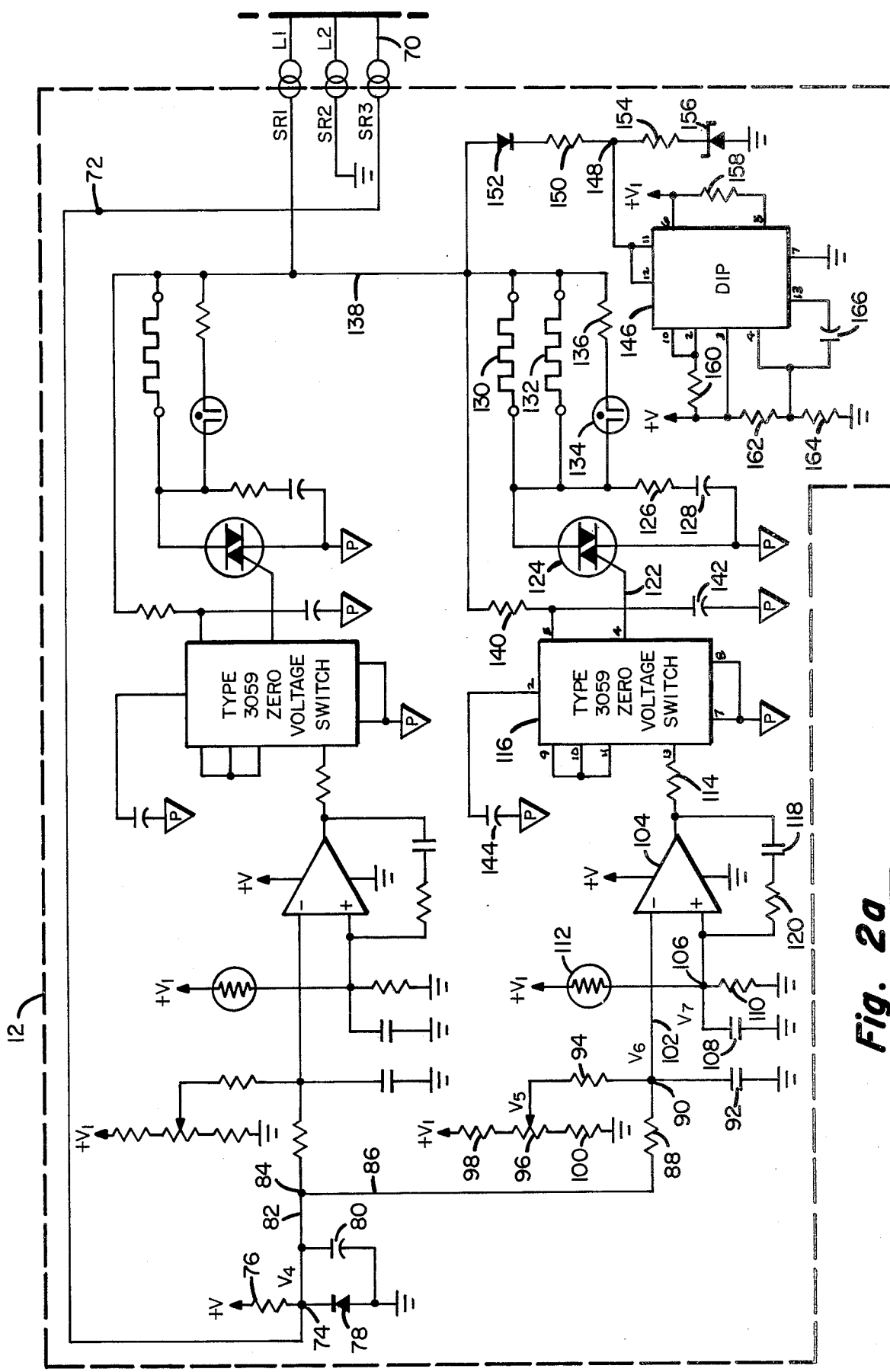

Referring now to FIGS. 2a and 2b, which when oriented as in FIG. 2, illustrate, by means of an electrical schematic diagram, the preferred embodiment of the temperature control unit of the present invention, there is shown as being enclosed by broken-line box 10, the remote set-point transmitter and by broken-line box 12, the heater control unit contained within the revolving drum. Both the remote set-point transmitter 10 and the control unit 12 are connected to a source 14 of electrical line voltage via lines L1 and L2. Specifically, line L1 is coupled by a conductor 16 to an input terminal 18 of the remote set-point transmitter unit 10. Similarly, line L2 is connected by a conductor 20 to an input terminal 22 of the remote set-point transmitter. Line voltage is connected to the heater control unit 12 by means of the slip rings SR1 and SR2 (FIG. 2a) as will be more fully described hereinbelow.

Referring to the remote set-point transmitter 10 (FIG. 2b), the input terminal 18 is coupled through a series combination of a diode 24 and a resistor 26 to a bus 28. The input terminal 22 is coupled through a parallel combination of a capacitor 30 and a Zener diode 32 to the bus 28. Connected in parallel with the parallel combination of the capacitor 30 and the Zener diode 32 is a voltage divider network comprised of resistors 34, 36, 38 and 40, all of which are connected in series between the input terminal 22 and the bus 28. Resistors 36 and 38 are variable and their function will be described later on in this specification. The junction point 42 between the series connected resistors 38 and 40 is connected to the non-inverting input of an operational amplifier 44.

The output from the operational amplifier 44 is connected to the input of a Darlington amplifier comprised of NPN transistors 46 and 48. Specifically, the base electrode of the transistor 46 is connected by a conductor 50 to the output terminal of the operational amplifier 44. The collector electrodes of transistors 46 and 48 are connected together at a junction 52 which, in turn, is connected by a conductor 54 to an output terminal 56 of the remote set-point transmitter 10. The emitter electrode of transistor 46 is connected to the base electrode of the transistor 48. The base electrode of transistor 48 is also coupled through a resistor 58 to a conductor 60 which is connected to the inverting input terminal of the operational amplifier 44. A resistor 62 couples the output from the operational amplifier 44 to the conductor 60. Also, the emitter electrode of the transistor 48 is connected by a conductor 64 to conductor 60. Finally, a resistor 66 is connected between the bus 28 and conductor 60 at junction point 68.

The output terminal 56 of the remote set-point transmitter 10 is connected by a conductor 70 to a set of slip rings SR3 (FIG. 2a). The slip rings SR1, SR2, and SR3 form the interface between the input electrical power and the set-point control and the heater control unit enclosed by broken-line box 12.

The details of the construction of the heater control unit 12 will now be explained.

The output from the remote set-point transmitter 10 is coupled through the slip rings SR3 and via conductor 72 to the input terminal 74 of the heater control unit. A resistor 76 couples the input terminal 74 to a source of positive potential +V which, for example, may be +10 volts. The input terminal 74 is also coupled through a semiconductor diode 78 to a point of reference potential such as ground. A capacitor 80 is connected directly in parallel with the diode 78.

In this particular unit which controls two separate heaters, the input terminal 74 is also connected by a conductor 82 to a junction point 84 at which point the heater control unit divides into two substantially identical halves. Because of this substantial identity, it is felt to be necessary to describe only one of the halves, it being understood that the other half is constructed in substantially the same way and a single circuit would be used to control a single heater.

The junction point 84 is coupled by a conductor 86 and through a resistor 88 to a junction point 90. This junction point is coupled by a capacitor 92 to ground and through a resistor 94 to the wiper arm of a potentiometer 96. One side of the potentiometer 96 is coupled through a fixed resistor 98 to a point of fixed potential $+V_1$ and the other side of the potentiometer is coupled through a resistor 100 to ground potential.

The junction point 90 is also connected by a conductor 102 to the inverting input of an operational amplifier 104. The non-inverting input of the operational amplifier 104 is connected to a junction point 106 which, in turn, is coupled through a parallel combination of a capacitor 108 and a resistor 110 to ground potential. A temperature sensitive resistor, or thermistor 112, is connected in series between the non-inverting input terminal of the operational amplifier 104 and the point of fixed potential $+V_1$.

The output terminal of the operational amplifier 104 is coupled through a resistor 114 to the input terminal of a zero voltage switch 116. The output from the operational amplifier 104 is also fed back via a capacitor 118 and a resistor 120 to the non-inverting input terminal 106.

The zero voltage switch 116 may be a Type CA3059 integrated circuit which is manufactured and sold by the RCA Corporation. Details of its internal construction and mode of operation may be obtained from the RCA Application Note ICAN-6182 published by RCA.

The output from the zero voltage switch 116 is connected by a conductor 122 to the gate electrode of a Triac 124. As is well known in the art, a Triac is a silicon AC switch which may be gate-triggered with an OFF to an ON state for either polarity of applied voltage.

Connected directly in parallel with the Triac 124 is a series combination of a resistor 126 and a capacitor 128. The heater elements 130 and 132 are connected in parallel with one another and with the series combination of a neon indicator lamp 134 and a resistor 136 when utilized, the indicator lamps not being required for operation of this system. One end of this parallel combination of components is connected by a conductor 138 to the power line L1 via the slip rings SR1. The other end of the parallel combination including the heater elements 130 and 132 is connected to an output of the Triac 124.

The zero voltage switch 116 receives its energization from the AC line L1 by way of the conductor 138 and a resistor 140. As is set forth in the above-mentioned Application Notes relating to the Type CA3059 zero voltage switch, this AC energization is applied to pin 5 of the device. A capacitor 142 couples the input pin 5 of the zero voltage switch 116 to a point of reference potential. Similarly, a capacitor 144 is coupled between this point of fixed potential and pin 2 of the zero voltage switch 116.

The voltages +V and +V₁ used in the heater control circuit are obtained from an integrated circuit type voltage regulator 146. Especially well suited for the present application is a Type 723 integrated circuit voltage regulator chip manufactured by the Fairchild Semiconductor Company. However, other manufacturers make and supply an equivalent IC device.

As is illustrated in FIG. 2a, pins 11 and 12 of the IC package 146 are connected together into a junction point 148 which, in turn, is coupled through a series combination of a resistor 150 and a diode 152 to the power line L1. The junction point 148 is coupled through a resistor 154 and a Zener diode 156 to ground. The output from the reference amplifier contained within the IC package 146 appears at pin 6 and is coupled by a resistor 158 to the non-inverting input pin 5 of the operational amplifier also embodied in the IC device 146. The desired voltage +V₁ is obtained directly from pin 6 of the IC package 146. The desired voltage +C used within the heater control network is obtained at the output pin 10 of the IC package 146 via a series voltage divider comprised of a resistor 160 and resistors 162 and 164. The inverting input to the operational amplifier contained within the IC package 146 is applied to pin 4 and is obtained at the junction point between the series connected resistors 162 and 164. A capacitor 166 is connected between pin 13 of the IC package 146 at this same junction point and provides frequency compensation, all as is explained in the Application Notes provided by the manufacturer as relating to the Type 723 voltage regulator integrated circuit chip.

Now that the details of the construction of the remote set-point transmitter 10 and the dual heater control network 12 have been described, consideration will now be given to the mode of operation of the preferred embodiment.

OPERATION

With reference to FIGS. 2a and 2b, the remote set-point transmitter, receives its energization from the source 14 which is connected by lines L₁ and L₂ to the input terminals 18 and 22 of the remote set-point transmitter 10. This alternating current input is half wave rectified by diode 24 and filtered by the combination of resistor 26 and capacitor 30 to provide a DC voltage which, in turn, is regulated by the Zener diode 32. Hence, a relatively fixed reference voltage is developed across the voltage divider network comprised of the resistors 34 through 40. Resistors 34, 36, 38 and 40 form a network to generate the set-point control voltage $V_2$ at the non-inverting input terminal of the operational amplifier 44. The variable resistor 36 may conveniently be used to provide a "zero adjust" control. The variable resistor 38 provides a means for adjusting the desired set-point while resistors 34 and 40 establish the set-point limits for the transmitter network.

The operational amplifier 44 modulates the base current provided to the Darlington connected pair of transistors 46 and 48 such that the voltage $V_3$ appearing at the junction point 68 is controlled to be equal to the voltage $V_2$ applied to the non-inverting input terminal of the operational amplifier 44. With the values so adjusted, the current through resistor 66, i.e., $I_1$, is proportional to the set-point voltage $V_2$. Since transistors 46 and 48 are selected to provide a high Beta value, the current flowing out from the amplifier 44 can be neglected and all of the current which flows through the resistor 66 can be considered to also flow through the slip ring SR3 via conductor 70 to provide a sink for the control current from the heater control unit shown enclosed by the dashed line box 12 in FIG. 2a.

It is to be noted that the current $I_1$ is relatively unaffected by the impedance in the collector circuit of the Darlington pair, provided that it does not become so large as to cause the transistors 46 or 48 to saturate. Thus, variations in the contact resistance presented to the system by the slip ring SR3 have negligible effect on the set-point control current $I_1$.

The current $I_1$ which flows through the resistor 66 in the set-point transmitter 10 can therefore also be considered to be flowing from the source +V and through the resistor 76, thus generating the voltage $V_4$ which is proportional to the set-point voltage $V_2$ in FIG. 2b. The capacitor 80 serves to stabilize the voltage $V_4$ in the event of abnormal intermittent contact of the slip ring SR3.

The voltage divider comprised of the potentiometer 96 and the fixed resistors 98 and 100 establish a voltage $V_5$. The resistors 88 and 94 establish the internal set-point voltage $V_6$ in accordance with the relationship:

$$V_6 = V_4(R_{94}/R_{88} + R_{94}) + V_5(R_{88}/R_{88} + R_{94})$$

Thus, it can be seen that the variable resistor 96 can be used to establish the nominal set-point and that the external controller 10 can induce a deviation from this nominal setting. Because it is normally desirable to limit the range of external control to approximately ±1% in this arrangement, resistors 88 and 94 are chosen to yield the relationship $V_6 = 0.02V_4 + 0.98V_5$. The resistor 110 is chosen such that under nominal conditions and with the temperature variable resistor or thermistor 112 at the desired temperature, the voltage $V_6$ is equal to the voltage $V_7$ appearing at junction point 106 to which the non-inverting input terminal of the operational amplifier 104 is connected. If the temperature in the drum varies such that the voltage $V_7$ becomes more positive than the voltage $V_6$, the output from the operational amplifier 104 will go positive. This positive signal provides the control input to the zero voltage switch 116. A positive voltage at the input of the zero voltage switch causes the Triac 124 to become conductive at each zero crossing of the line voltage applied to it by way of conductor 138 and resistor 140. With the Triac conducting, current is drawn from the AC line and through the heating elements 130 and 132 to thereby restore the drum temperature. When the output from operational amplifier 104 is negative, the zero voltage switch is inhibited and the Triac 124 remains non-conductive.

If it were not for the feedback network comprised of the resistor 120 and the capacitor 118 which are associated with the operational amplifier 104, the output from the operational amplifier would slowly cross the turn-on threshold of the zero voltage switch 116, resulting in many cycles of erratic turn-on of the Triac 124. The resistor 120 and the capacitor 118 provide dynamic hysteresis which eliminates any dwell at the threshold point. The purpose of the capacitors 92 and 108 is to suppress noise which may be generated by the power control circuit. Were it not for these capacitors, such noise could deleteriously affect the operation of the amplifier 104 and cause erratic control to result.

It is to be noted that the heater control unit shown in FIG. 2a is partitioned into two substantially identical networks except that the upper network only provides control over the current flowing through a single heating element whereas the lower circuitry controls the flow of current flowing through two parallel connected heating elements 130 and 132. In some applications, such as in the control of the temperature of a drum used in a xerographic copying system, it is essential to maintain precise control over the temperature of the surface of the drum. Hence, it may be desirable to fragment the heating elements and provide individual control to each such that an extended surface can have a desired temperature gradient. For example, the heating elements 130 and 132 may be physically disposed at either end of the rotating drum, while the heating element associated with the upper control circuitry in FIG. 2a may be disposed between the elements 130 and 132.

The DC power for the heater control unit 12 is also derived from the AC line voltage. Specifically, resistor 150 and diode 152 along with the Zener diode 156 and resistor 154 initially rectify the AC applied voltage which is supplied to the control unit 12 via the slip rings SR1 and SR2. The resulting voltage, although only partially regulated, is now within a range to be further regulated by the monolithic IC voltage regulator chip 146. The regulator unit 146 produces stable DC voltage signals $+V$ and $+V_1$ which are utilized by the control circuitry as indicated by the corresponding legends on the voltage terminals.

As a further means of preventing extraneous noise from deleteriously affecting the operation of the heater control unit of the present invention, it has been found desirable to group the grounds associated with the power carrying components, i.e., the zero voltage switch 116 and the Triac 124 and connected to the grounds associated with the control signal producing circuitry, i.e., the operational amplifier 104 and its associated input voltage defining elements at one point only. Thus, ground noise which might otherwise occur due to the relatively high currents associated with the power bearing components are precluded from flowing in the control circuitry.

Thus, it can be seen that an operator may, by proper manipulation of the variable resistor elements 36 and 38 in the remote set-point transmitter 10, produce a control signal for the heating elements 130 and 132 contained within the revolving drum heater unit. This control signal, as well as the applied input AC power, is fed through slip rings to the control receiver and heating elements. Because of the unique design employed, variations in the slip ring or brush resistance caused by wear or contamination do not deleteriously affect the set-point as established by the remote transmitter.

Accordingly, the foregoing preferred embodiment provides a means whereby the various objects and advantages set forth hereinabove can be realized. Of course, it is within the abilities of one of ordinary skill in the art to make various modifications and changes to the preferred embodiment disclosed herein. For example, if it were desired to provide an indication at a point external to the drum of the actual temperature within the drum, one could replace the variable resistor 38 in FIG. 2b with a temperature sensitive resistor, thus making it possible to transmit to an external point, through slip rings, an indication of the temperature within the drum. Furthermore, the principles of this invention may be applied to other than drum-type heaters. For example, it may be desirable to maintain control of the pressure or some other parameter contained within a rotating drum element. Only ordinary skill in the art would be required to adapt the above-described system to such other applications. Accordingly, the scope of the invention is to be determined from the appended claims.

We claim:
1. Control apparatus for controlling the value of a parameter within a moving enclosure comprising:
 (a) a rotatable enclosure having a parameter control element therein;
 (b) a current regulating circuit coupled to said parameter control element which is contained in said enclosure and rotatable therewith;
 (c) an external, fixedly mounted constant current transmitter for generating a direct current control signal which represents, by means of a constant current, a desired parameter value to be maintained in said enclosure; and
 (d) slip-ring means for connecting said direct current control signal to said current regulating circuit.

2. Apparatus as in claim 1 wherein said current regulating circuit includes:
 (a) a differential amplifier having first and second inputs and an output, said first input coupled to said slip-ring to receive said control signal;
 (b) parameter sensing means coupled to said second input for producing a second control signal which varies as a function of the parameter being controlled in said enclosure;
 (c) switching means having a first input coupled to the output of said differential amplifier and an ouput, said switching means producing a third control signal at its output when said output from said differential amplifier is of a predetermined polarity; and
 (d) semiconductor current control means coupled to said parameter control element and to said output of said switching means.

3. Apparatus as in claim 1 wherein said external constant current transmitter comprises:
 (a) a pair of input terminals adapted to be connected to a source of alternating current voltage;
 (b) rectifier, filter and regulating means coupled to said pair of input terminals for producing a regulated direct current voltage;
 (c) an operational amplifier having a pair of input terminals and an output terminal;
 (d) means for applying a predetermined fraction of said regulated direct current voltage to one of said pair of input terminals of said operational amplifier;
 (e) means coupling said output terminal of said operational amplifier to the other of said pair of input terminals of said operational amplifier such that the signals applied to said pair of input terminals remain equal when said predetermined fraction is changed; and
 (f) means coupling said output terminal of said operational amplifier to said slip-ring means.

4. Apparatus as in claim 2 and further including regulator means adapted to be coupled to a source of alternating current voltage for producing said source of reference potential.

5. Apparatus as in claim 2 wherein said parameter is the temperature within said drum.

6. Apparatus as in claim 5 wherein said parameter control element is a resistance heating element.

* * * * *